United States Patent [19]

Blout

[11] 4,372,716
[45] Feb. 8, 1983

[54] FREIGHT BRACING BULKHEAD TROLLEY AND LATCHING SYSTEM

[75] Inventor: Bennett O. Blout, Berwyn, Ill.

[73] Assignee: Evans Products Company, Portland, Oreg.

[21] Appl. No.: 207,421

[22] Filed: Nov. 17, 1980

[51] Int. Cl.³ .................. B60P 7/14; B61D 45/00; B63B 25/24
[52] U.S. Cl. .................. 410/134; 410/138; 410/139
[58] Field of Search .......... 16/97, 98, 99; 308/16, 308/18, 39, 72; 410/130, 132, 133, 134, 135, 136, 137, 138, 139

[56] References Cited

U.S. PATENT DOCUMENTS

| | | | |
|---|---|---|---|
| 2,282,589 | 5/1942 | Mayne | 308/18 X |
| 3,332,727 | 7/1967 | Gandrud | 308/72 |
| 3,476,041 | 11/1969 | Matyas et al. | 410/134 |
| 3,636,887 | 1/1972 | Konrad et al. | 410/134 |
| 3,741,127 | 6/1973 | Williams | 410/134 |
| 3,745,934 | 7/1973 | Williams | 410/133 |

Primary Examiner—Robert B. Reeves
Assistant Examiner—Howard Beltran
Attorney, Agent, or Firm—Robert E. Howard

[57] ABSTRACT

An improved trolley structure for a freight bracing bulkhead assembly. The sprocket wheels of the trolley structure are designed to cooperate with the same apertures in supporting tracks located in a cargo area as cooperate with the locking pins of the bulkhead assembly. The sprocket wheels are mounted on the trolley shaft by means which permit the axis of each sprocket wheel to shift relative to the axis of the trolley shaft. A safety member is provided to prevent vertical disengagement of the sprocket wheels from the tracks.

7 Claims, 5 Drawing Figures

FREIGHT BRACING BULKHEAD TROLLEY AND LATCHING SYSTEM

BACKGROUND OF THE INVENTION

This invention relates to a trolley system for freight bracing bulkhead assemblies, and more particularly to an improved trolley system that precludes accidental falling of the bulkhead assembly from the overhead supporting tracks.

In the transportation of freight, and particularly the shipment of freight by railcar and truck trailer, various systems have been proposed for holding the freight against movement during transit. One such device used in the art of bracing is the bulkhead assembly. Bulkhead assemblies are essentially large movable walls that are supported by a trolley structure for movement along the length of the cargo area of a railroad car or truck trailer upon overhead crane rails or tracks. The trolley supporting arrangement must permit free movement of the bulkhead to preselected bracing positions, and should also provide means to prevent the inadvertent displacement of the trolley structure from the rails and the attendant falling of the bulkhead assembly therefrom. Various trolley configurations have been proposed in the prior art. See, for example, the trolley assemblies described in U.S. Pat. Nos. 3,741,127 and 3,745,934.

It is an object of this invention to provide an improved and simplified trolley system for a freight bracing bulkhead assembly.

It is another object of this invention to provide a bulkhead trolley system that will prevent accidental disengagement of the bulkhead from the supporting crane rails.

SUMMARY OF THE INVENTION

The improved trolley system of this invention is adapted to be embodied in a freight bracing bulkhead assembly that is supported for movement in a cargo area between selected freight bracing positions upon a pair of spaced tracks.

The bulkhead assembly includes a trolley structure adapted to support the bulkhead for movement along such tracks and a pair of locking members that are supported at the opposite upper edges of the bulkhead for movement between a locked position and a released position. The locking members have means adapted to cooperate with apertures in the tracks when the locking means are in their locked position for retaining the bulkhead in the selecting bracing position.

Sprocket wheels located at each end of the trolley shaft are located in the same plane as the locking pins. The sprocket wheels are adapted to engage the tracks for supporting the bulkhead for movement along the tracks utilizing the same apertures with which the locking pins cooperate when the locking pins are in their locked position.

The sprocket wheel assemblies have at least one roller member coaxially disposed ajacent each sprocket wheel adapted to engage or cooperate with that portion of the track adjacent to the locking pin apertures in the track.

Each sprocket wheel assembly is mounted on the trolley shaft by means of a mounting element which permits the axis of such sprocket wheel assembly to shift relative to the axis of the trolley shaft.

Horizontally disposed safety members extend from vertically disposed bulkhead supporting members into close proximity to the underside of the tracks to prevent vertical disengagement of the sprocket wheels from the tracks.

DETAILED DESCRIPTION OF THE PREFERRED EMBODIMENTS

Figure 1:
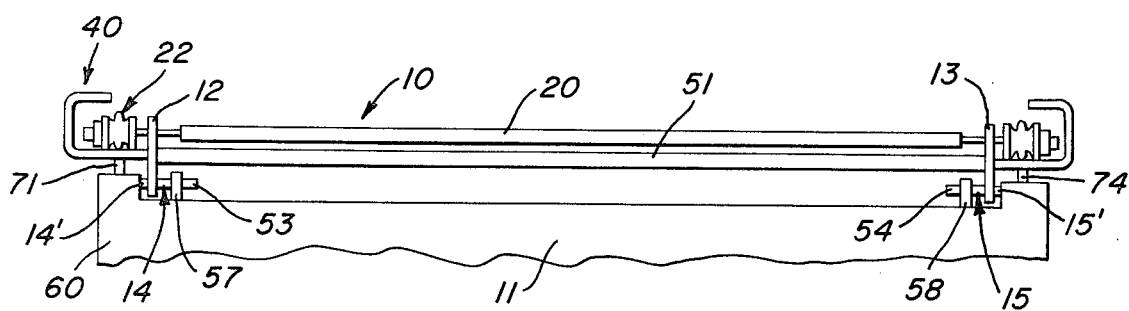
FIG. 1 is a front view of the trolley system supporting a freight bracing bulkhead in accordance with the present invention.

A trolley system for a freight bracing bulkhead assembly constructed in accordance with the present invention is identified generally by the reference numeral 10 in FIG. 1. Trolley assembly 10 pivotally supports bulkhead 11 via supporting members or plates 12 and 13. Supporting plates 12 and 13 are connected to bulkhead 11 by means of pivot pins 14 and 15 in a manner which will be described in more detail below.

Trolley assembly 10 is comprised of trolley shaft 20 which has a narrowed extension 21 at its outer end for receiving sprocket wheel assembly 22. The right side of trolley assembly 10 is identical to the left side illustrated in FIG. 2, and will not be described separately.

Sprocket wheel assembly 22 is comprised of a sprocket wheel 24 having a plurality of teeth extending therefrom which are adapted to cooperate with the crane rail in a manner to be described. The sprocket wheel assembly 22 has inner and outer roller portions 25 and 26, respectively, which are coaxially disposed adjacent to, and on each side of, sprocket wheel 24, and which engage the crane rail in a manner to be described. In the preferred embodiment, sprocket wheel 24 and roller members 25 and 26 are a single casting.

Pin 27 pressed onto the outer end of trolley shaft extension 21 engages the hub portions 28 and 29 of sprocket wheel assembly 22 to cause it to rotate with the trolley shaft during movement of the bulkhead assembly. Pin 27 also limits the outer movement of sprocket wheel assembly 22, which has limited lateral movement capability along trolley shaft extension 21 in order to provide for any minor variation in the distance between crane rails. One or both sprocket wheel assemblies may be provided with such ability for lateral movement.

Sprocket wheel assembly 22 is snugly fit onto the outer end of trolley shaft extension 21, as illustrated, and is mounted on trolley shaft extension 21 by means of spherical bearing mounting 30 having mating concave and convex surfaces which can slidably move with respect to each other. Such a mounting enables the axis of sprocket wheel assembly 22 to shift relative to the axis of the trolley shaft which permits roller portions 25 and 26 to both continue to engage the crane rail or track during movement of the trolley assembly therealong despite crane rail deformation, thereby preventing excessive loading of one roller over the other.

Figure 2:
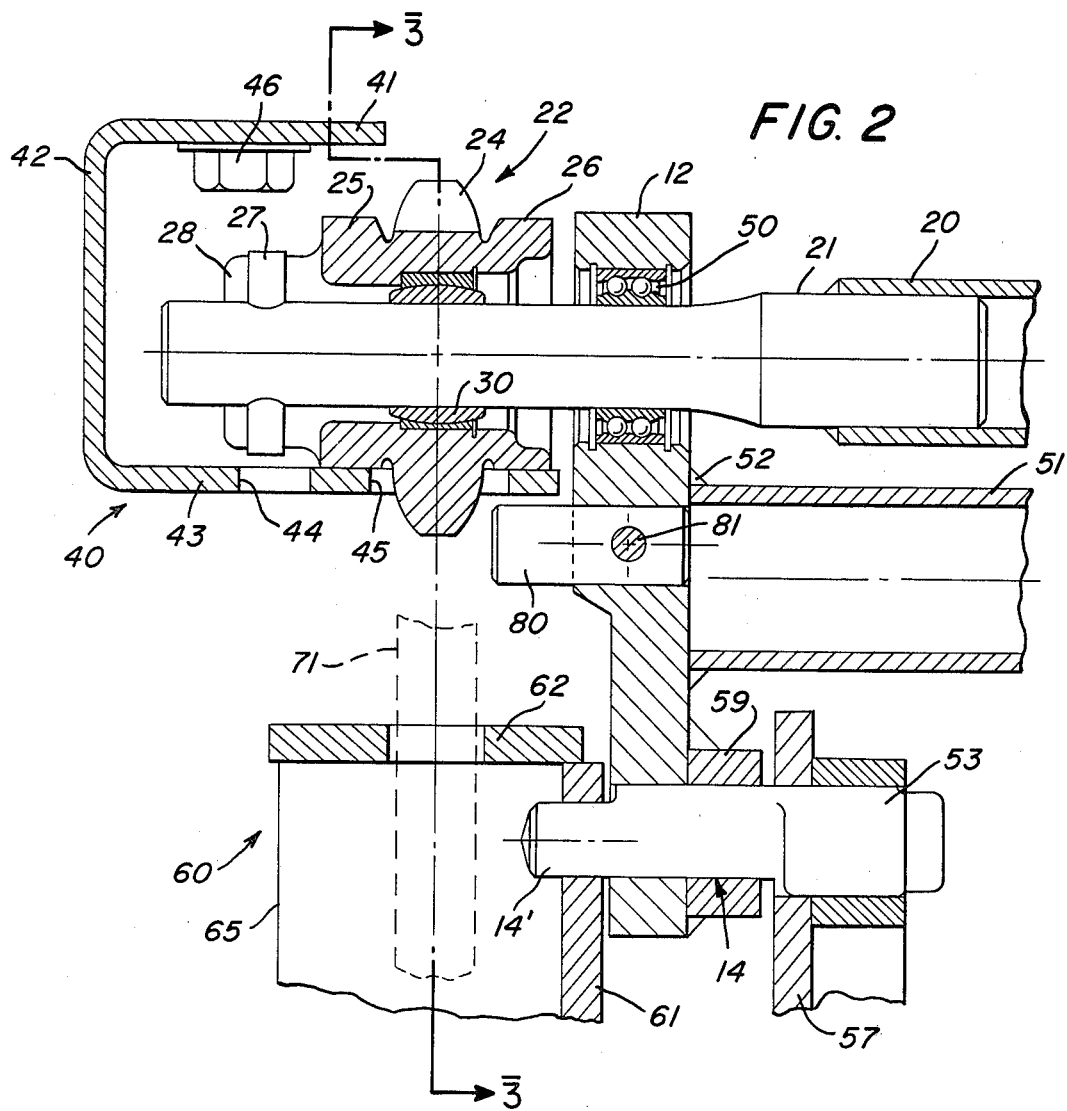
FIG. 2 is a cross sectional, enlarged view of the upper left-hand corner of the bulkhead assembly shown in FIG. 1.

Trolley assembly 10, connected to bulkhead 11, is suspended from a pair of overhead tracks or crane rails, only one of which, 40, is illustrated in detail in FIG. 2. Crane rail 40 has a short, horizontally extending upper leg 41, a vertically extending leg 42 and a horizontally extending lower leg 43 which is somewhat longer than horizontally extending upper leg 41.

Figure 4:
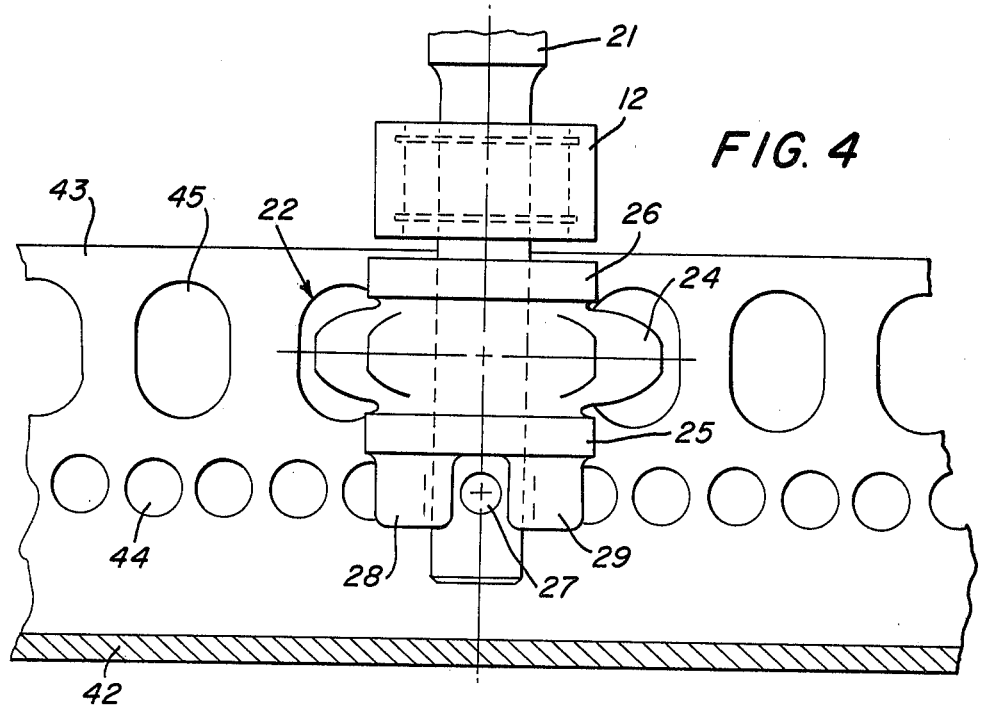
FIG. 4 is a cross-sectional view taken along the line 4—4 of FIG. 3.

Crane rail 40, as illustrated, is of the type generally employed in railcars and such crane rails conventionally have two rows of apertures 44 and 45 extending longitudinally therealong, as illustrated in FIG. 4. In conventional bulkhead assemblies, the sprocket wheel is smaller than that of the present invention and the teeth thereof cooperate with the smaller apertures 44. Apertures 45 in the conventional crane rail assembly are adapted to cooperate only with the locking pin assembly, in a manner which will be subsequently described.

It is one of the features of the present invention that the sprocket wheel assembly is designed so that the teeth thereof engage the apertures normally reserved for the locking pin assembly, which are of a larger dimension, thereby permitting a larger sprocket wheel with larger teeth to be employed which strengthens the trolley assembly and also lessens the chance of the sprocket wheel becoming disengaged from the apertures of the crane rail with which they cooperate. Thus, in the present invention, apertures 44, although present on crane rails already installed in rail cars, serve no purpose relative to the trolley assembly of the present invention, and are illustrated for explanatory purposes only.

Crane rail 40 is attached to the top of the rail car or truck trailer via fastening means 46 in any manner which is conventional in the art.

Sprocket shaft 21 is journaled at its opposite ends in bearings 50 of supporting plate 12. Tubular member 51 is attached to supporting plate 12 by means of a weld 52 or other suitable attachment means. Pivot pins 53 and 54 extend through supporting plate 12 and 13 to attach the same to bulkhead 11, as illustrated. Pins 14 and 15 having enlarged body portions 53 and 54 pass through and are pivotally attached to pivot attachments 57 and 58 of bulkhead 11. Pin 14 also passes through a block 59 which constitutes part of supporting plate 12. Pivot pin 14 has two axes, one of body portion 14' and one for enlarging body portion 53, which are eccentrically disposed relative to each other and, upon rotation of pivot pin 14, the distance between the main portion of the bulkhead 11 and the trolley assembly 10 can be somewhat varied in a manner which is known in the art. Pivot pin 15, with body portion 15' and enlarged body portion 54 functions in a similar manner. See, for example, U.S. Pat. No. 3,741,127.

Figure 3:
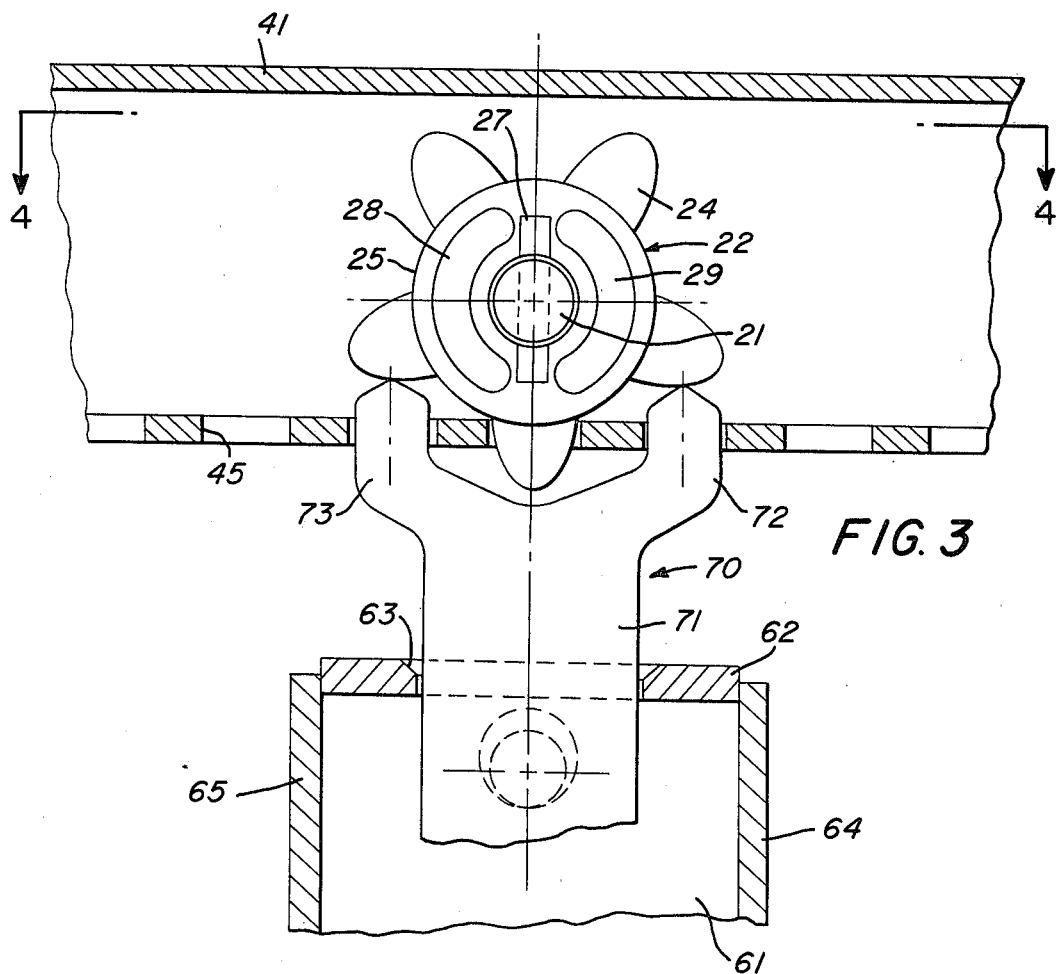
FIG. 3 is a cross-sectional view taken along the line 3—3 of FIG. 2.

Bulkhead 11 has a bulkhead locking pin housing 60 on the left side thereof as viewed in FIG. 1 and an identical portion on the right side which will not be described separately. Locking pin housing 60 has an interior portion 61, and upper wall 62 with an opening 63 located therein and front and back walls 64 and 65, respectively. Locking pin assembly 70 is comprised of a locking pin forging 71 and a pair of pin projections 72 and 73. Locking pin forging 71 extends through the opening 63 in housing 60 and is movable from a locked position, such as that illustrated in FIG. 3 to an unlocked or released position when pins 72 and 73 are retracted vertically downwardly out of cooperation with apertures 45 via a linkage assembly and in a manner which is well known to the art, such as the linkage assembly disclosed in U.S. Pat. No. 3,741,127. As can best be seen in FIG. 3, pins 72 and 73, in the locked position, cooperate with non-adjacent locking pin apertures 45 in order that the downwardly facing tooth 24 of sprocket wheel assembly 22 may cooperate with a locking pin aperture 45 located between the locking pin aperture 45 with which said pins 72 and 73 cooperate.

The locking pin assembly 70 illustrated is the upper locking pin assembly of the bulkhead; there are lower locking pin assemblies which cooperate with locking pin plates fixed on the floor of the car in a manner which is well known in the art such as, for example, disclosed in U.S. Pat. No. 3,741,127.

A removable safety or hold-down pin 80 extends through supporting plate 12 and is attached thereto by a removable pin or key 81. Safety pin 80 extends outwardly beneath the lower horizontal key 43 of crane rail 40 a distance such that it does not engage the teeth of sprocket wheel 24 but is located at such a distance below lower leg 43 that upward movement of the bulkhead and trolley assembly causes safety pin 80 to contact the underside of lower leg 43 of crane rail 40 before the teeth of sprocket wheel 24 are completely removed from aperture 45, thereby preventing the accidental disengagement of the trolley assembly from the crane rail which could cause the bulkhead assembly to fall.

Figure 5:
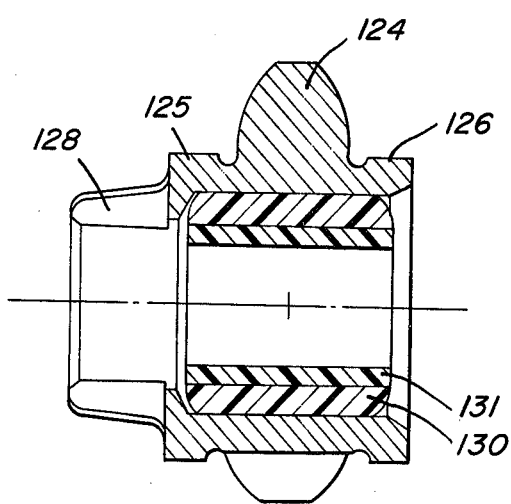
FIG. 5 is a cross-sectional view of an alternative sprocket wheel assembly mounting means.

An alternative sprocket wheel mounting assembly, which permits the axis of the sprocket wheel to shift relative to the axis of the trolley shaft for reasons previously described, is illustrated in FIG. 5. In this embodiment, sprocket wheel 124, associated roller members 125 and 126 and hub 128, are mounted on a trolley shaft by means of a bushing assembly comprising a deformable elastomeric element 130 bonded to metal tube 131. The deformable, elastomeric element 130 permits the axis of sprocket wheel 124 to shift relative to the axis of the trolley shaft upon which it is mounted, thereby enabling roller members 125 and 126 to both maintain contact with the crane rail surface with which they cooperate despite crane rail deformations.

It is understood that the foregoing description is that of the preferred embodiments of the present invention but that variations and modifications may be made without departing from the spirit and scope of the invention, as defined by the appended claims.

I claim:

1. In a freight bracing bulkhead assembly comprising a bulkhead supported by a trolley system having first and second sprocket wheels located at the opposite ends of a trolley shaft, the teeth of said sprocket wheels cooperating with apertures located in a pair of spaced, longitudinally extending overhead tracks located in a cargo area for effecting the movement of the bulkhead between selected freight bracing positions in said cargo area, said bulkhead assembly including first and second locking means supported at the opposite, upper edges of the bulkhead for movement between a locked position and a released position, said first and second locking means each including a pair of locking pins adapted to cooperate with apertures located in said tracks when said locking means are in the locked position, the improvement comprising locating said first sprocket wheel in the same plane as the pair of locking pins of the first locking means and locating the second sprocket wheel in the same plane as the pair of locking pins of the second locking means, said pins of each of said first and second locking means being spaced apart a distance such that, in the locked position, said pins cooperate with spaced apertures and, in the locked position, the downwardly facing of said teeth of each of said first and second sprocket wheels cooperates with an aperture located between the apertures with which said locking pins cooperate.

2. The freight bracing bulkhead assembly of claim 1 wherein said first and second sprocket wheels each have at least one coaxially disposed roller member located adjacent to said sprocket wheel adapted to engage that portion of said track adjacent to said apertures.

3. The freight bracing bulkhead assembly of claim 1 wherein vertically disposed supporting members connect said bulkhead to said trolley shaft, said supporting members having a horizontally disposed safety member extending therefrom and into close proximity to the underside of the track located adjacent to said supporting members for preventing vertical disengagement of said sprocket wheels from said tracks.

4. The freight bracing bulkhead assembly of claim 1 wherein said first and second sprocket wheels each have a coaxially disposed roller member located adjacent to both sides thereof adapted to engage those portions of said track adjacent to, and on both sides of, said apertures.

5. The freight bracing bulkhead assembly of claim 4 wherein said first and second sprocket wheels are mounted on said trolley shaft by means of a mounting element adapted to permit the axis of each of said sprocket wheel assembly to individually shift relative to the axis of said trolley shaft and to permit lateral movement of said sprocket wheels along said trolley shaft.

6. The freight bracing bulkhead assembly of claim 5 wherein said mounting element comprises a spherical bearing having mating concave and convex surfaces slidably movable with respect to each other.

7. The freight bracing bulkhead assembly of claim 5 wherein said mounting element comprises a deformable bushing.

* * * * *